(12) United States Patent
Lee

(10) Patent No.: US 6,980,793 B2
(45) Date of Patent: Dec. 27, 2005

(54) APPARATUS AND METHOD FOR GENERATING BILLING DATA ACCORDING TO CONTENTS OF MOBILE COMMUNICATION SYSTEM

(75) Inventor: Gang-Seok Lee, Seoul (KR)

(73) Assignee: SK Telecom Co., Ltd., Seoul (KR)

( * ) Notice: Subject to any disclaimer, the term of this patent is extended or adjusted under 35 U.S.C. 154(b) by 302 days.

(21) Appl. No.: 10/397,554

(22) Filed: Mar. 25, 2003

(65) Prior Publication Data
US 2004/0076143 A1   Apr. 22, 2004

(30) Foreign Application Priority Data
Oct. 21, 2002  (KR)  .................. 10-2002-0064195

(51) Int. Cl.$^7$ ............................................ H04M 11/00
(52) U.S. Cl. ...................... 455/406; 455/407; 455/408; 379/114.01; 379/114.02
(58) Field of Search ............................... 455/406, 407, 455/408; 379/114.01, 114.02

(56) References Cited

U.S. PATENT DOCUMENTS 6,018,726 A * 1/2000 Tsumura ..................... 705/412
6,038,439 A * 3/2000 Rune .......................... 455/406
6,088,431 A * 7/2000 LaDue ...................... 379/114.2
6,690,929 B1 * 2/2004 Yeh ........................... 455/406

* cited by examiner

Primary Examiner—Ahmad F. Matar
Assistant Examiner—Quynh H. Nguyen
(74) Attorney, Agent, or Firm—Baker Botts L.L.P.

(57) ABSTRACT

Disclosed herein is an apparatus and method for generating billing data according to contents of a mobile communication system. The present invention has a packet data analyzing device for analyzing billing data records provided from the packet data service node and packet data provided from the packet data service node, generating billing data in real time on the basis of analyzed results, and transmitting the billing data to the billing server. In the present invention, a subscriber identifying process is executed in which subscriber information is obtained by analyzing billing data records generated by a packet data service node when a data service is provided to a mobile terminal of a subscriber. A packet analyzing process for packet data provided to the mobile terminal of the subscriber is executed. Billing data are generated in real time by including the subscriber information in results analyzed through the packet analyzing process. Accordingly, the present invention enables real-time billing according to contents used by subscribers and further enables billing even in an Always-On type network by discriminating MIN information of the subscribers for subscriber traffic, regardless of whether or not protocols have been previously developed, and whether or not protocols have been previously registered.

3 Claims, 3 Drawing Sheets

APPARATUS AND METHOD FOR GENERATING BILLING DATA ACCORDING TO CONTENTS OF MOBILE COMMUNICATION SYSTEM

RELATED APPLICATIONS

This application claims priority to Korean Application No. 10-2002-0064195 filed Oct. 21, 2002.

BACKGROUND OF THE INVENTION

1. Field of the Invention

The present invention relates generally to an apparatus and method for generating billing data according to contents of a mobile communication system, which enables real-time billing according to contents used by subscribers.

2. Description of the Prior Art

In a conventional billing system, if a mobile communication terminal is connected to a mobile communication network and user authentication has been completed, a billing start data record (start UDR: Usage Data Record) indicating the start of billing is generated to start a session. After the billing start data record (start UDR) is generated and a predetermined period of time has elapsed, an interim calculation data record (interim UDR) is generated. After the session has been ended, a billing stop data record (stop UDR) is generated, and billing is performed according to the billing stop data record (stop UDR).

However, while the conventional billing system performing the billing according to the above process can learn information on the amount of packet data used with respect to wireless data services using protocols which are not registered in advance, it cannot identify subscribers.

Accordingly, the conventional billing system is problematic in that, for wireless data services using protocols which are not registered, it performs billing by collecting information on the amount of packet data used and billing data record (UDR) using independent systems and identifying subscribers according to the relationship between the information on the amount of packet data used and the billing data (UDR) to generate billing data, so it is impossible to perform real-time billing and it is difficult to bill the subscribers according to contents used by the subscribers.

SUMMARY OF THE INVENTION

Accordingly, the present invention has been made keeping in mind the above problems occurring in the prior art, and an object of the present invention is to provide an apparatus and method for generating billing data according to contents of a mobile communication system, which enables real-time billing according to contents used by subscribers.

In order to accomplish the above object, the present invention provides an apparatus for generating billing data according to contents of a mobile communication system, the mobile communication system having a packet data service node connected to a data core network to provide a data service to a mobile terminal of a subscriber and a billing server to perform billing, the data core network being connected to both a contents server that provides contents and the Internet, comprising a packet data analyzing device for analyzing billing data records provided from the packet data service node and packet data provided from the packet data service node, generating billing data in real time on the basis of analyzed results, and transmitting the billing data to the billing server.

Further, the present invention provides a method of generating billing data according to contents of a mobile communication system, comprising the steps of executing a subscriber identifying process of obtaining subscriber information by analyzing billing data records generated by a packet data service node when a data service is provided to a mobile terminal of a subscriber; executing a packet analyzing process for packet data provided to the mobile terminal of the subscriber; and generating billing data in real time by including the subscriber information in results analyzed through the packet analyzing process.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Hereinafter, embodiments of the present invention will be described in detail with reference to the attached drawings.

Figure 1:
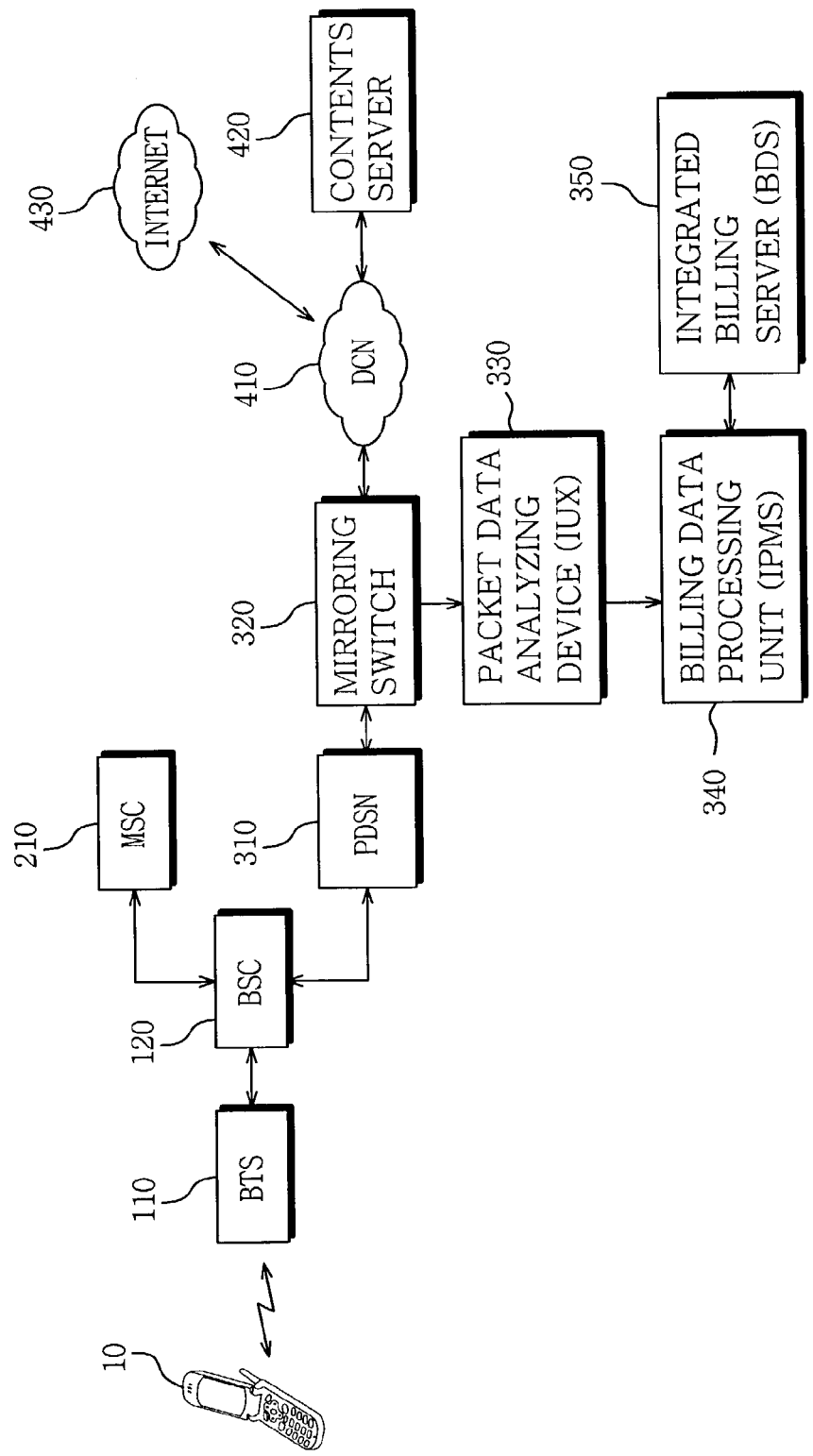
FIG. 1 is a block diagram showing the logical configuration of a mobile communication network connected to a packet data analyzing device according to the present invention.

FIG. 1 is a block diagram showing the logical configuration of a mobile communication network connected to a packet data analyzing device according to the present invention.

Referring to FIG. 1, the mobile communication system of the present invention comprises a Base Transceiver Station (BTS) 110 that communicates with a mobile terminal 10, and a Base Station Controller (BSC) 120 that operates and maintains the BTS 110.

The BSC 120, which is a system performing a switching function in a network, connects a mobile terminal subscriber in a network to another network. Further, the BSC 120 is connected to both a Mobile Switching Center (MSC) 210 which is connected to various supplementary systems to provide supplementary services, and a Packet Data Service Node (PDSN) which provides a packet data service.

The BSC 120 connects voice calls and circuit data calls between the BTS 110 and the MSC 210, connects packet data calls between the BTS 110 and the packet data service node 310, and performs a voice coding (vocoding) function for voice calls.

The packet data service node 310 is connected to a Data Core Network (DCN) 410 through a mirroring switch 320. The DCN 410 is connected to both a contents server 420 to provide contents to users and the Internet 430. In this case, the mirroring switch 320 switches packet data between the packet data service node 310 and the data core network 410, copies the packet data, and transmits the copied packet data to a packet data analyzing device (IUX) 330, which will be described later.

An apparatus for generating billing data according to the present invention comprises the packet data analyzing device 330, a billing data processing unit (IPMS: Information Processing Management System) 340, and an integrated billing server (BDS: Billing Data Server) 350. The packet data analyzing device 330 analyzes the packet data copied by the mirroring switch 320 and generates billing data (UDR). The billing data processing unit (IPMS) 340 collects, stores and processes the billing data generated by the packet data analyzing device 330. The integrated billing server 350 performs integrated billing in response to the output information of the billing data processing unit 340.

The packet data service node 310 generates a billing start data record (start UDR) that indicates the start of a session for a data service, an interim calculation data record (interim UDR) of the session and a billing stop data record (stop UDR) that indicates the end of the session, and provides packet data to the mobile terminal 10.

Figure 2:
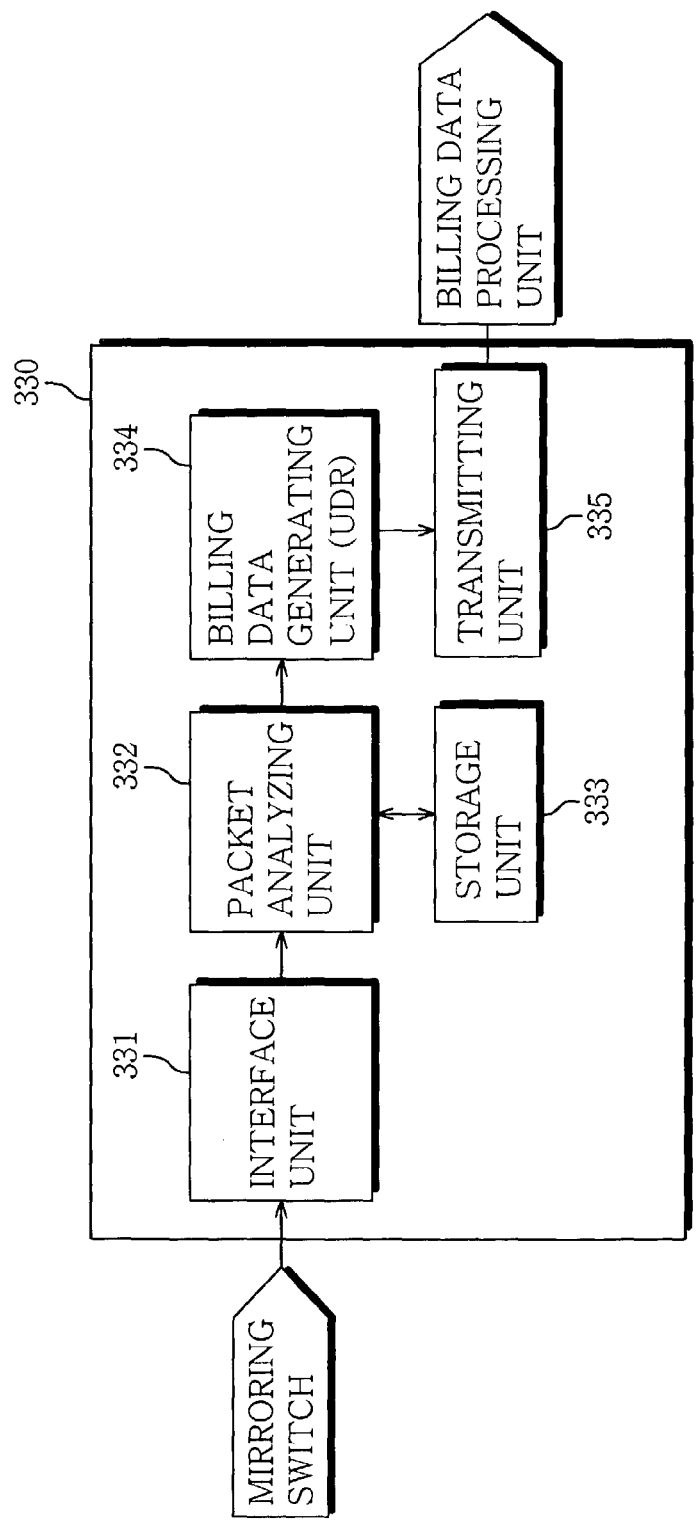
FIG. 2 is a block diagram showing the configuration of the packet data analyzing device according to the present invention.

FIG. 2 is a block diagram showing the configuration of the packet data analyzing device (330) according to the present invention.

As shown in FIG. 2, the packet data analyzing device 330 of the present invention comprises an interface unit 331 to interface with the mirroring switch 320 that copies the packet data, a packet analyzing unit 332 to analyze the packet data received through the interface unit 331, a storage unit 333 to store information analyzed by the packet analyzing unit 332, a billing data generating unit 334 to generate integrated billing data on the basis of results analyzed by the packet analyzing unit 332, and a transmitting unit 335 to transmit the integrated billing data generated by the billing data generating unit 334 to the billing data processing unit 340.

The packet data analyzing device 330 of the present invention having the above configuration executes a subscriber identifying process to manage a Mobile Identification Number (MIN) of the subscriber, extracted from the billing start data record (start UDR), the interim calculation data record (interim UDR) and the billing stop data record (stop UDR) generated by the packet data service node 310. In addition, the packet data analyzing device 330 executes a packet analyzing process of analyzing packet data copied by and received from the mirroring switch 320 to discriminate the type of contents. These operations are shown in FIG. 3, which will be described later.

Figure 3:
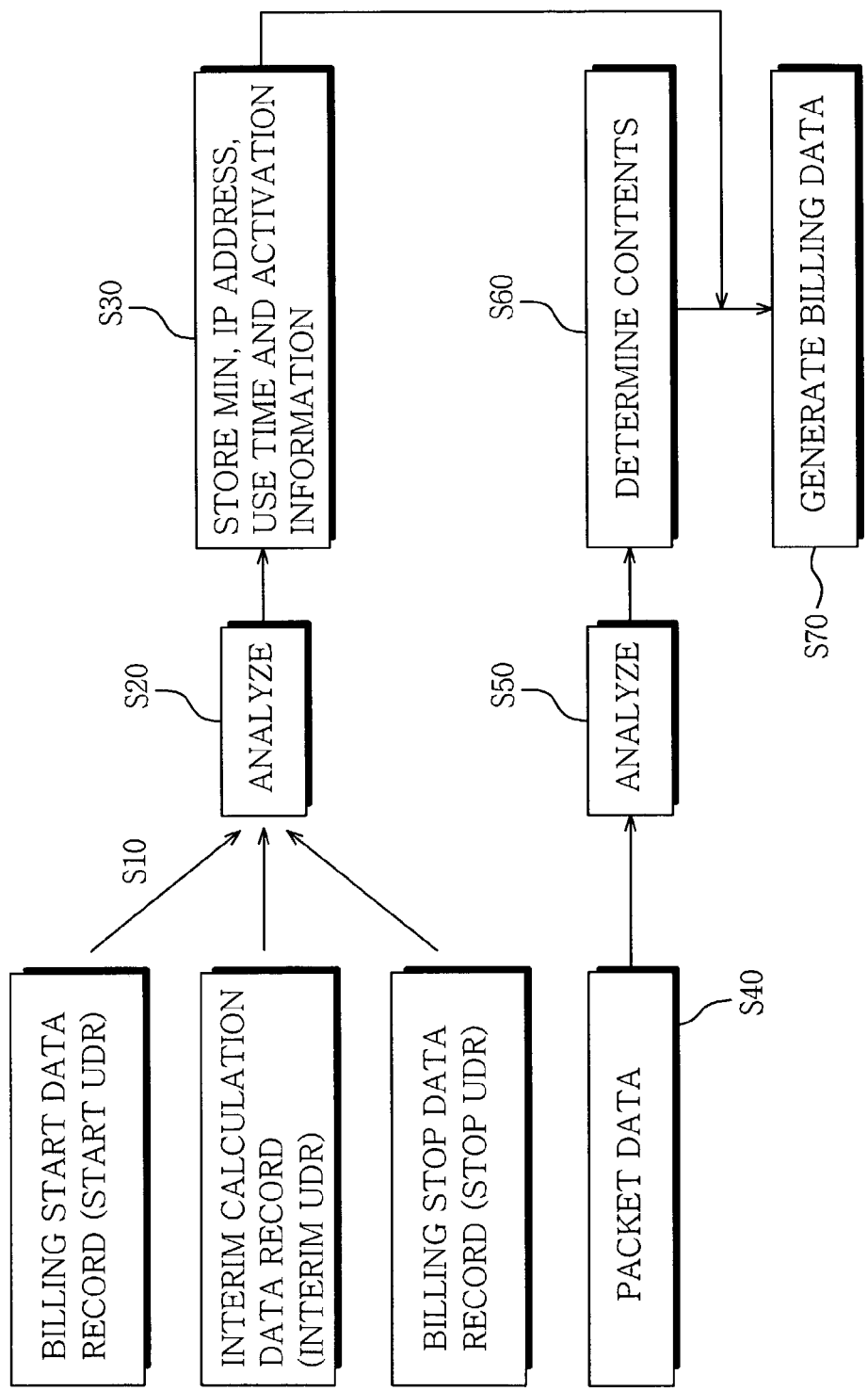
FIG. 3 is a flowchart of a process executed by the packet data analyzing device according to the present invention.

FIG. 3 is a flowchart of a process executed by the packet data analyzing device 330 according to the present invention.

As shown in FIG. 3, the packet data analyzing device 330 of the present invention executes the subscriber identifying process of identifying a subscriber. For this operation, the interface unit 331 receives a billing start data record (start UDR), an interim calculation data record (interim UDR), and a billing stop data record (stop UDR) from the packet data service node 310 at step S10. Further, the packet analyzing unit 332 analyzes the billing start data record (start UDR), the interim calculation data record (interim UDR) and the billing stop data record (stop UDR) at step S20.

At this time, the packet analyzing unit 332 extracts a Mobile Identification Number (MIN), an Internet Protocol (IP) address, a use time and activation information of the subscriber, and the like from the above data records at step S20, and stores the extracted information in the storage unit 333 at step S30.

Meanwhile, the packet data analyzing device 330 executes a packet analyzing process. For this process, the interface unit 331 receives the packet data copied by and transmitted from the mirroring switch 320 at step S40. The packet analyzing unit 332 analyzes the received packet data at step S50. The packet analyzing unit 332 determines the type and amount of packet data used, that is, contents, on the basis of the information analyzed at step S50, at step S60.

Further, the billing data generating unit 334 generates billing data according to the information stored in the storage unit 333, such as the MIN, the IP address, the use time and the activation information, and the type and amount of contents used, determined at step S60, at step S70.

At step S70, the billing data generating unit 334 generates the billing data by including the information, such as the MIN, the use time and the IP address stored in the storage unit 333, in the type and amount of packet data used, that is, information set according to contents, and transmits the billing data through the transmitting unit 335 to the billing data processing unit 340 that collects, stores and processes the billing data.

Accordingly, the packet data analyzing device 330 can generate the billing data by discriminating MIN information of the subscriber with respect to subscriber traffic using protocols which have been previously developed or are not developed yet, and protocols which have been previously registered or are not registered yet, according to the protocols.

The operation of a mobile communication network including the packet data analyzing device of the present invention, having the above configuration and performing the above operation, is described in detail.

First, if the user accesses the mobile communication network through the mobile terminal 10, the mobile terminal 10 is assigned resources in connection with the mobile switching center 210. The mobile terminal 10 is connected to the packet data service node 310 through the assigned resources to establish a data connection.

After the authentication of the mobile terminal 10 is successfully achieved, the packet data service node 310 transmits the billing start data record (start UDR) that indicates the start of a session for a current data service to the mirroring switch 320, and switches the packet data between the mobile terminal 10 and the contents server 420 or the Internet 430 connected to the data core network 410.

On the other hand, the mirroring switch 320 copies the billing start data record (start UDR) which is generated by the packet data service node 310 and which indicates the start of the session, and transmits the copied billing start data record (start UDR) to the packet data analyzing device 330.

The interface unit 331 of the packet data analyzing device 330 receives the billing start data record (start UDR) and transmits the billing start UDR to the packet analyzing unit 332. The packet analyzing unit 332 analyzes the billing start data record (start UDR) and stores information containing a MIN, an IP address, a use time, activation information and the like in the storage unit 333 on the basis of the analyzed results.

Further, the packet analyzing unit 332 transmits the analyzed information to the billing data generating unit 334. The billing data generating unit 334 transmits the billing start data record (start UDR) to the billing data processing unit 340 through the transmitting unit 335, thus indicating the start of the billing by informing the billing data processing unit 340 of the start of the session.

After the packet data service node 310 generates the billing start data record (start UDR) and then a predetermined period of time has elapsed, the packet data service node 310 generates an interim calculation data record (interim UDR). After the session has ended, the packet data service node 310 generates a billing stop data record (stop UDR). The interim calculation data record (interim UDR) and the billing stop data record (stop UDR) are transmitted to the packet data analyzing device 330 through the mirroring switch 320.

Next, the packet data analyzing device 330 analyzes the interim calculation data record (interim UDR) and the billing stop data record (stop UDR) in the same manner as the process of the above-described billing start data record (start UDR), and stores information, such as the subscriber information and the use time, in the storage unit 333 on the basis of the analyzed results. As described above, the packet data analyzing device 330 executes a subscriber identifying process of managing the Mobile Identification Number (MIN) of the subscriber.

Further, the packet data analyzing device 330 executes a process of analyzing packet data, which is described below.

The mirroring switch 320 connected to the packet data service node 310 copies packet data transmitted and received between the packet data service node 310 and the data core network 410 and transmits the copied packet data to the packet data analyzing device 330.

The interface unit 331 of the packet data analyzing device 330 receives the copied packet data from the mirroring switch 320. Further, the packet analyzing unit 332 analyzes the packet data received by the interface unit 331 on the basis of preset information so as to discriminate the type of contents provided at the present time. Further, the packet analyzing unit 332 transmits information based on the analyzed results and the user information stored in the storage unit 333, such as the MIN, the IP address, the use time, etc., to the billing data generating unit 334.

The billing data generating unit 334 generates integrated billing data according to the analyzed results, that is, the type of contents of a data service provided at the present time, and transmits the integrated billing data to the billing data processing unit 340 through the transmitting unit 335. The billing data processing unit 340 stores the integrated billing data, processes the integrated billing data to have desired formats, and then transmits the processed integrated billing data to the integrated billing server 350.

The integrated billing server 350 bills the subscriber for contents used by the subscriber on the basis of information received from the billing data processing unit 340.

As described above, the present invention provides an apparatus and method for generating billing data according to contents of a mobile communication system, which enables real-time billing according to contents used by subscribers and further enables billing even in an Always-On type network by discriminating MIN information of the subscribers for subscriber traffic, regardless of whether or not protocols according to the type of contents have been developed, and whether or not the protocols have been registered.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for generating billing data according to contents of a mobile communication system, the mobile communication system having a packet data service node connected to a data core network to provide a data service to a mobile terminal of a subscriber and a billing server to perform billing, the data core network being connected to both a contents server that provides contents and the Internet, comprising:
   a packet data analyzing device for analyzing billing data records provided from the packet data service node and packet data provided from the packet data service node, generating billing data in real time on the basis of analyzed results, and transmitting the billing data to the billing server;
   wherein the packet data analyzing device comprises:
      an interface unit for receiving the billing data records and the packet data;
      a packet analyzing unit for executing a subscriber identifying process of extracting subscriber information including a Mobile Identification Number (MIN), an Internet Protocol (IP) address, a use time, and activation information, from the billing data records and for executing a packet analyzing process of acquiring billing information including the type and amount of contents used, by analyzing the packet data;
      a storage unit for storing information analyzed through the subscriber identifying process; and
      a billing data generating unit for generating integrated billing data by including the subscriber information analyzed through the subscriber identifying process in billing information acquired through the packet analyzing process.

2. An apparatus according to claim 1, further comprising a mirroring switch for copying the packet data and the billing data records provided from the packet data service node, and transmitting the copied packet data and billing data records to the packet data analyzing device.

3. A method of generating billing data according to contents of a mobile communication system, comprising the steps of:
   executing a subscriber identifying process of obtaining subscriber information including a Mobile Information Number (MIN), an Internet Protocol (IP) address, a user time, and activation information, by analyzing billing data records which indicate billing start, interim calculation, and billing stop and which are generated by a packet data service node when a data service is provided to a mobile terminal of a subscriber;
   executing a packet analyzing process of acquiring billing information including the type and amount of contents used, by analyzing packet data provided to the mobile terminal of the subscriber through the packet data service node at the time of providing a data service; and
   generating billing data in real time by including the subscriber information analyzed through the subscriber identifying process in billing information acquired through the packet analyzing process.

* * * * *